Figure 15:
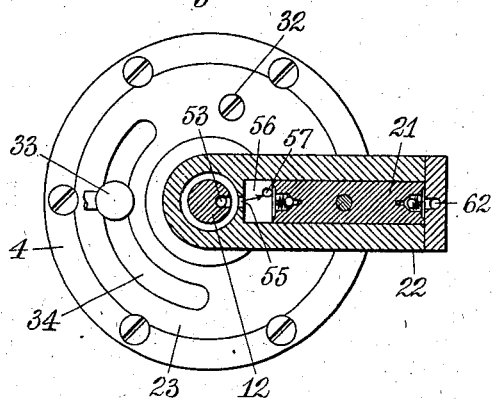

No. 728,457. PATENTED MAY 19, 1903.
B. M. W. HANSON.
INDEXING APPARATUS.
APPLICATION FILED MAY 20, 1901.
NO MODEL. 7 SHEETS—SHEET 1.
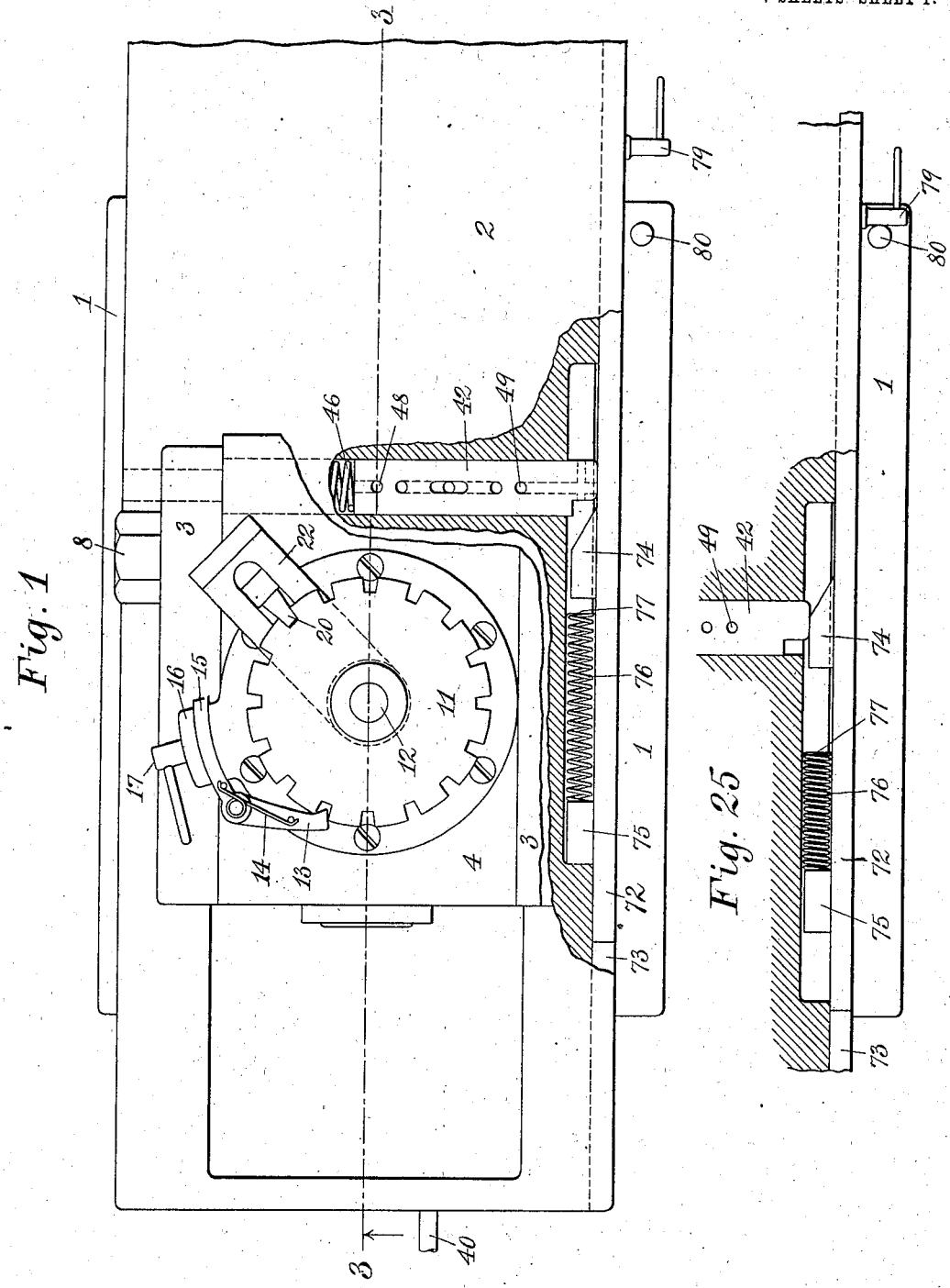
Witnesses:
Joseph Merritt
H. Mallner
Inventor
B. M. W. Hanson
By Wm H Honiss. Att'y.

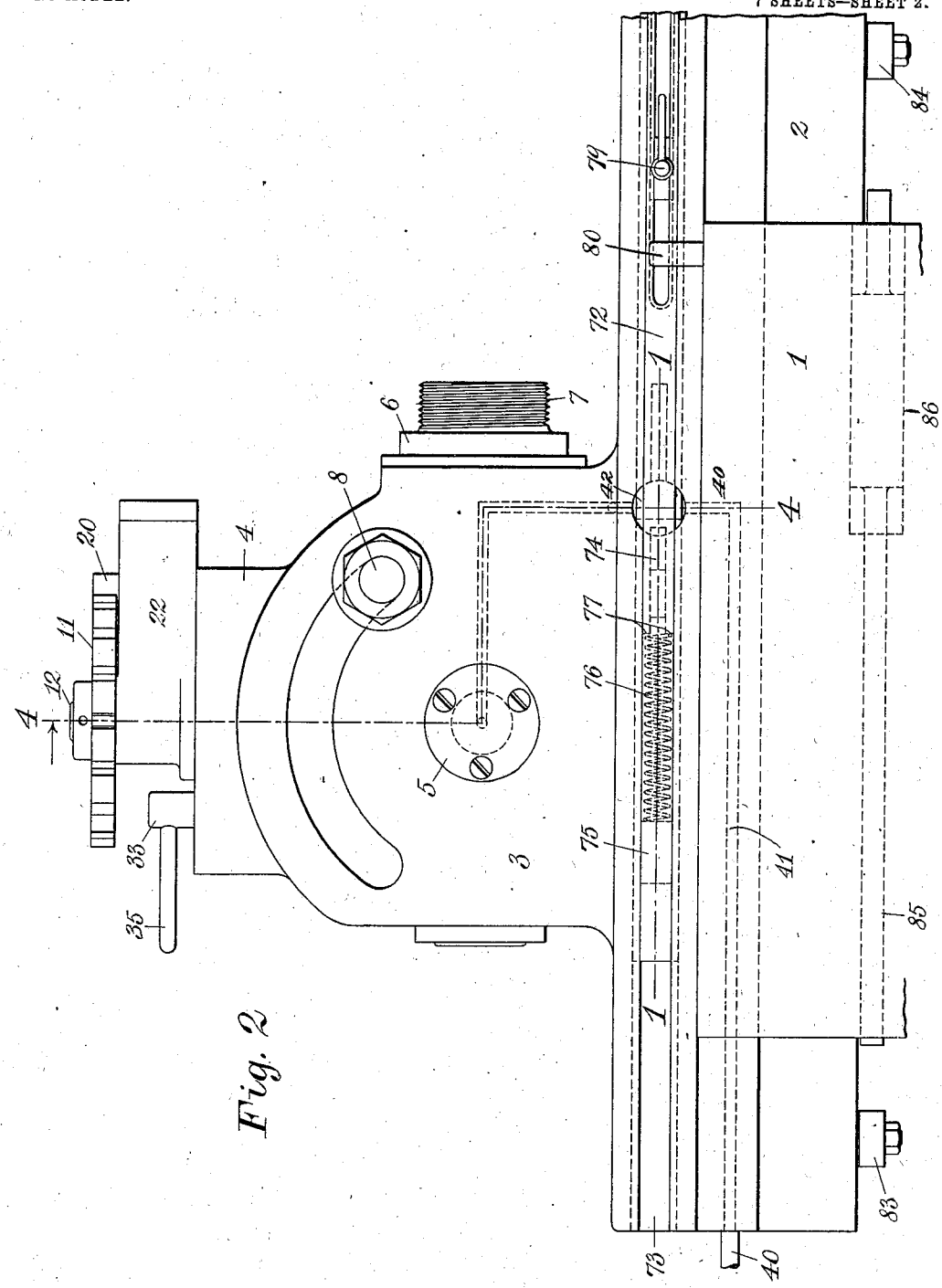

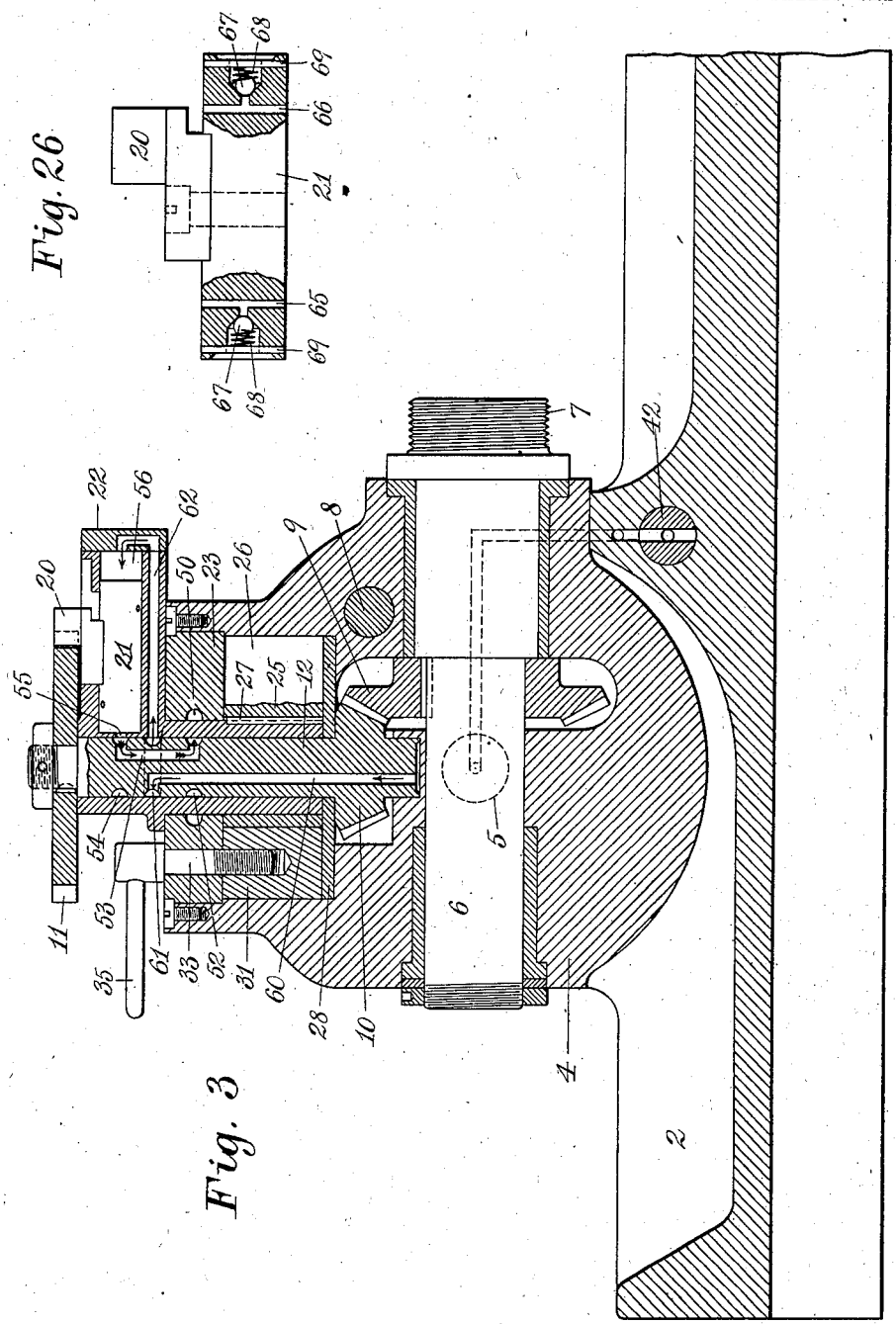

No. 728,457. PATENTED MAY 19, 1903.
B. M. W. HANSON.
INDEXING APPARATUS.
APPLICATION FILED MAY 20, 1901.

NO MODEL. 7 SHEETS—SHEET 4.

Witnesses:
Joseph Merritt
H. Mallner

Inventor
B. M. W. Hanson
By Wm H Honiss, Att'y

No. 728,457. PATENTED MAY 19, 1903.
B. M. W. HANSON.
INDEXING APPARATUS.
APPLICATION FILED MAY 20, 1901.
NO MODEL. 7 SHEETS—SHEET 5.
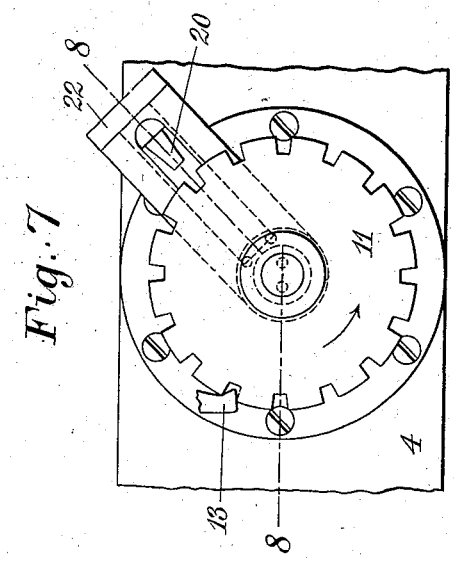
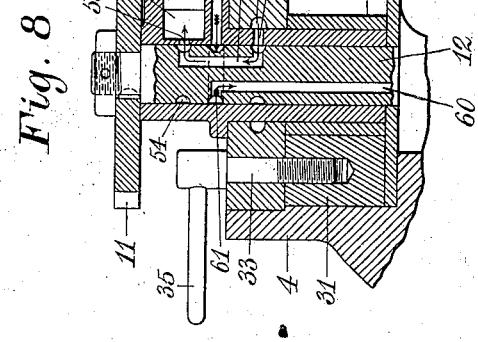
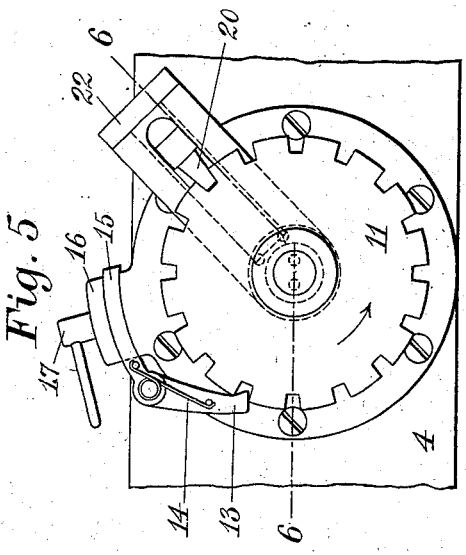
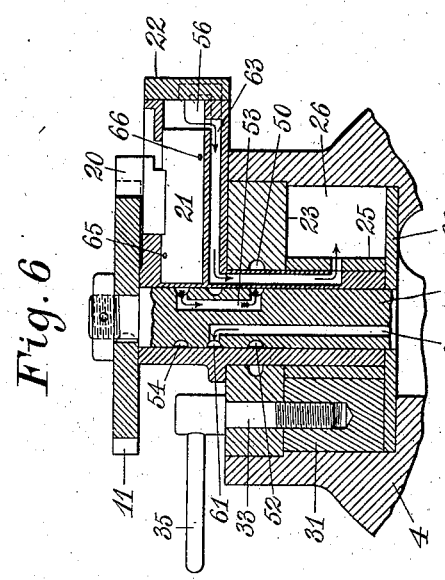
Witnesses:
Joseph Merritt
H. Mallner
Inventor
B. M. W. Hanson
By Wm H Honiss, Atty.

No. 728,457. PATENTED MAY 19, 1903.
B. M. W. HANSON.
INDEXING APPARATUS.
APPLICATION FILED MAY 20, 1901.
NO MODEL. 7 SHEETS—SHEET 6.
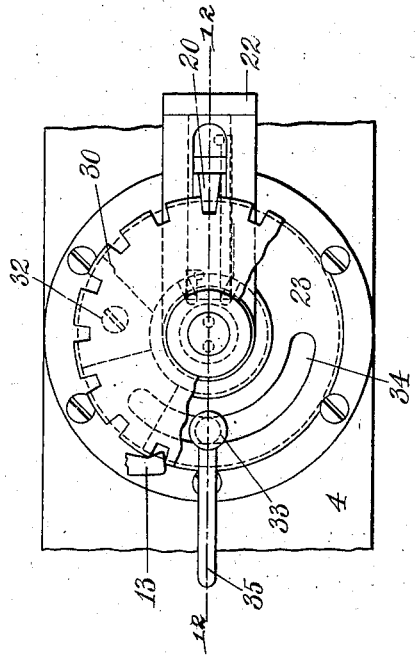
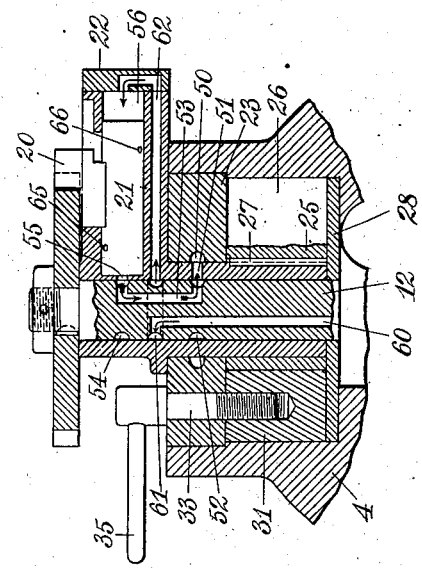
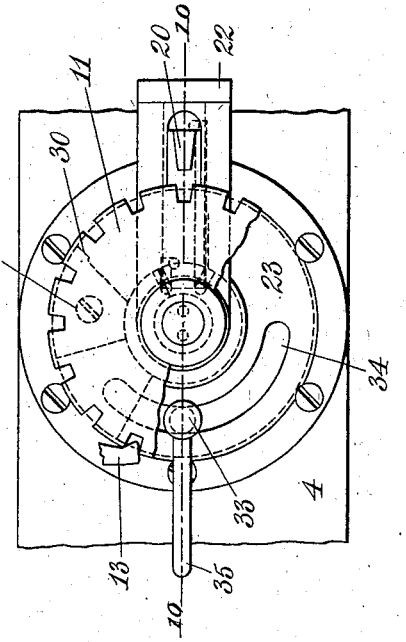
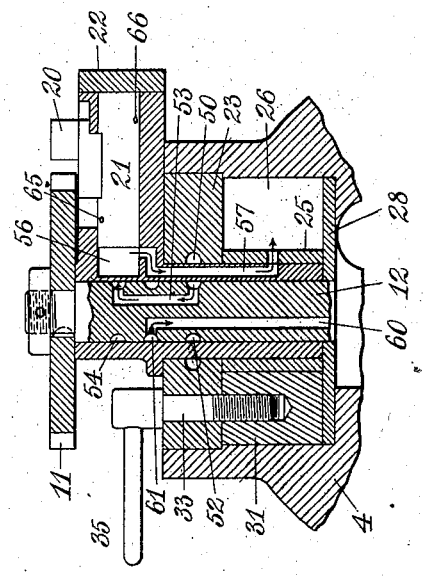
Witnesses:
Joseph Merritt
H. Mallner
Inventor
B. M. W. Hanson
By Wm. H. Honiss, Att'y No. 728,457. PATENTED MAY 19, 1903.
B. M. W. HANSON.
INDEXING APPARATUS.
APPLICATION FILED MAY 20, 1901.

NO MODEL. 7 SHEETS—SHEET 7.

Witnesses:
Joseph Merritt
H. Mallner

Inventor
B. M. W. Hanson
By W. H. Honiss, Att'y.

No. 728,457. Patented May 19, 1903.

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

INDEXING APPARATUS.

SPECIFICATION forming part of Letters Patent No. 728,457, dated May 19, 1903.

Application filed May 20, 1901. Serial No. 61,120. (No model.)

*To all whom it may concern:*

Be it known that I, BENGT M. W. HANSON, a citizen of Sweden, and a resident of Hartford, in the county of Hartford and State of Connecticut, have invented certain new and useful Improvements in Indexing Apparatus, of which the following is a specification.

This invention relates to improved devices for utilizing fluid-pressure for operating the moving parts of machinery of various kinds to which it is or may be found applicable, the object being to increase the certainty and efficiency and rapidity of operation, while reducing the number of mechanical parts required and lessening the cost of construction, assembling, and maintenance thereof. By means of these improvements the full energy of the pressure is applied directly to the parts to be moved, even though the latter may be separated from the source of energy by a number of joints and without the use of correspondingly-articulated mechanical links or other connections, thus avoiding the loss of motion or waste of energy which would be consumed in friction at the joints and also avoiding the shock or the loss of time ordinarily consumed in overcoming the inertia of the parts by mechanical means.

The invention furthermore includes means whereby the correct and certain sequence of operation of the respective parts is insured, so that none of the movements in a desired sequence can take place until the completion of the previous movement or operation.

This invention is herein shown and described as being embodied in an apparatus for indexing the work-carrying spindle of a well-known type of milling-machine, the body of the machine being shown only to a sufficient extent to enable the relation of my invention thereto to be understood.

Figure 16:
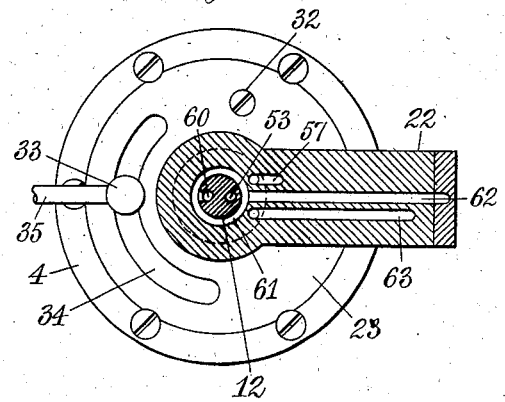
Figure 17:
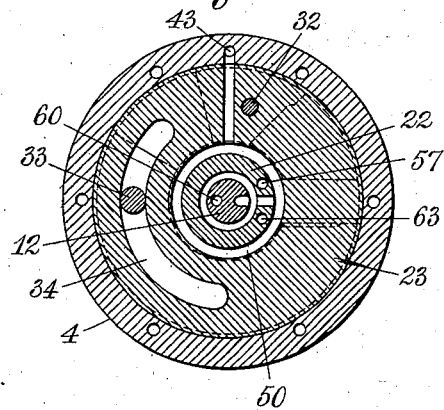
Figure 18:
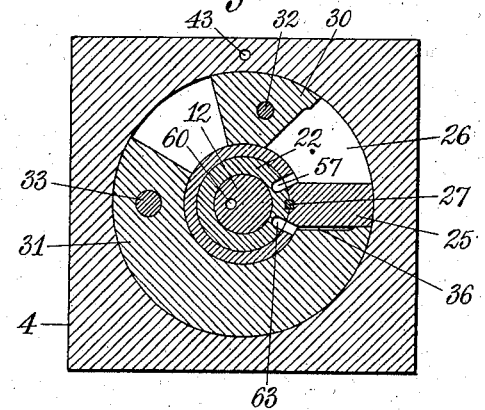
Figure 13:
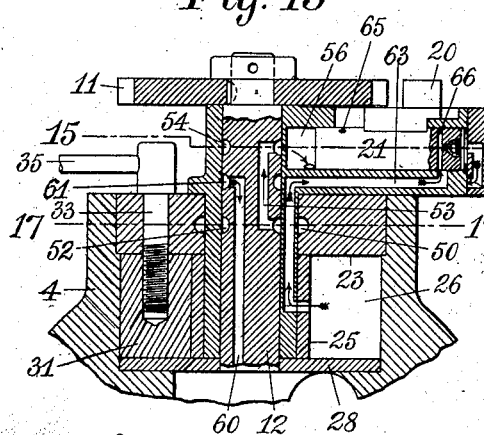
Figure 14:
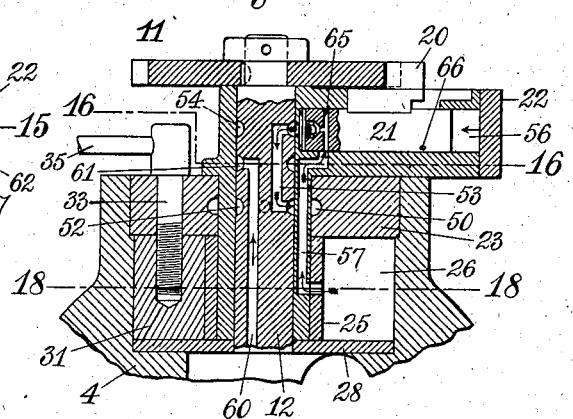

Figure 1 of the drawings is a plan view, and Fig. 2 is a side view, of an indexing apparatus or "head" embodying my invention, Fig. 1 being shown partly in section taken along the line 1 1 of Fig. 2. Fig. 3 is a side view in longitudinal section taken along the line 3 3 of Fig. 1. Fig. 4 is an end view in section taken along the line 4 4 of Fig. 2. Figs. 5 to 12, inclusive, represent the various positions of the indexing devices throughout a cycle of their movement. Figs. 5, 7, 9, and 11 are plan views, while Figs. 6, 8, 10, and 12, respectively, are side views projected therefrom, each being represented in section taken along the correspondingly-numbered line of its associated plan view. The sectional side views, Figs. 6 and 8, are to be read as being at right angles to the lines 6 6 and 8 8, respectively. Figs. 5 and 6 represent the position of the indexing-pawl and its carrying-arm while at rest between the indexing operations. Figs. 7 and 8 represent the first step in the indexing movement—namely, the retracting of the pawl. Figs. 9 and 10 represent the succeeding step, the index-arm being carried to proper position for engagement with the desired notch of the index-plate. Figs. 11 and 12 represent the next step, which is the moving of the pawl into engagement with the said notch, after which the arm and the index-plate are moved to the position shown in Fig. 5, thus completing the cycle. Figs. 13 and 14 are similar sectional side views showing the provision for the escape of the exhaust at the opposite ends of the respective strokes of the pawl and its arm. Fig. 15 is a plan view in section taken along the line 15 15 of Fig. 13. Fig. 16 is a plan view in section taken along the line 16 16 of Fig. 14. Fig. 17 is a plan view in section taken along the line 17 17 of Fig. 13, while Fig. 18 is a plan view in section taken along the line 18 18 of Fig. 14. Fig. 19 is a side view, and Fig. 20 an end view, of the indexing-pawl arm of the previous figures. Fig. 21 is a side view, and Fig. 22 an underneath view, of the oscillating piston for moving the pawl-arm of Figs. 19 and 20. Fig. 23 is an end view of the index-arm and the pawl piston in section taken on the line 23 23 of Fig. 19, while Fig. 24 is a similar view in section taken on the line 24 24 of Fig. 19. Fig. 25 is a fragmentary view showing the controlling-valve and its operating devices at the opposite end of their strokes and illustrating, by comparison with the similar parts of Fig. 1, the respective ranges of movement. Fig. 26 is a side view, in enlarged scale, of the index-pawl and its piston of the preceding figures, showing the arrangement of the exhaust-ports and check-valves thereof.

In the drawings the bed of the milling-machine is indicated by the numeral 1, upon which is mounted the slide or table 2, provided with the upwardly-extending housings 3, between which is mounted the swinging head 4, which turns upon the pivot-studs 5 5 and is clamped in the desired positions by the bolt 8. The main spindle 6 is journaled in the head and is herein shown to be provided with a screw-thread 7 for receiving a work-carrying chuck or face-plate, although this spindle may also be adapted to receive, support, or drive either the work to be operated upon or the tools therefor by means of a chuck or a turret in many well-known ways. The indexing devices may also be applied directly upon this spindle or directly to the said chuck or turret, especially when it is not necessary to swing the head upward to any considerable angle, but where, as is herein shown, the upwardly-swinging or universal head is employed it is preferable to arrange the indexing devices at an angle to the spindle and to communicate therewith by means of gears, as herein shown. The gear 9 is fixed upon the spindle 6 and meshes with a bevel-gear 10, which is also journaled in the swinging head by means of its stem or shaft 12 and is adapted at its upper end to receive the required index-plates 11, of which any desired number may be employed to suit the number of divisions or the angular spacing required.

As a means for retaining the index-wheel in the positions to which it may be moved by the indexing devices a detent-pawl 13 is provided, which is held into contact with the index-plate by means of the spring 14. In order to enable the resting positions of the spindle 6 to be varied, the detent-pawl is mounted upon an adjustable pivot-block 15, which is preferably mounted to slide in an adjacent portion 16 of the swinging head 4 concentrically with the center of the index-plate, being clamped to place by means of the clamping-screw 17, this arrangement enabling the detent-pawl to be adjusted with the index-plate without changing its radial relation thereto.

The desired intermittent rotations of the index-plate and its associated spindle 6 are imparted by means of the indexing-pawl 20, attached to a piston 21, mounted in a piston-chamber 56 to slide in a substantially radial relation to the index-plate upon the pawl arm or carrier 22, which is best shown in detail in Figs. 19 and 20 and is journaled in a plate 23, supported by the swinging head 4. The arm 22 is journaled concentrically with the gear 10 and its shaft 12, to which the indexing movement is applied and through which it may be transferred, and may, as herein shown, form the bearing for supporting that gear and shaft. The swinging movements of the arm 22 are imparted by means of an oscillating piston 25, (best shown in detail in Figs. 21 and 22,) which is secured to the lower end of the arm 22 by means of the key 27 and swings in an annular chamber 26 between the plates 23 and 28, which form the upper and lower walls, respectively, of the piston-chamber 26. For convenience in construction the annular chamber 26 is extended in a complete circle, the unused portions of which receive the segmental stop-pieces 30 and 31, which determine the extent of oscillatory movement of the piston 25 and which can by arrangement and adjustment be adapted to a wide range of movements. In the embodiment herein shown the stop 30 is fixed to the plate 23 by means of a bolt 32, while the stop 31 is adjustably secured to that plate by means of the bolt 33, which extends through the concentric slot 34 of the plate and may be squared to receive a wrench or may, as herein shown, be provided with a handle 35, by means of which the stop 31 may be moved to any desired position and be firmly clamped therein against the plate 23. In Fig. 18 is best shown the relative positions of the stops for the movements of the piston herein described corresponding with the angular movement of the arm 22 between its positions shown in Figs. 7 and 9. When the piston is in the position shown in Fig. 18, the arm is in the position shown in Fig. 9, and when the piston moves from the position shown in Fig. 18 against the stop 30 it moves the arm 22 to the position shown in Figs. 5 and 7. The piston-engaging faces of the stop-pieces 30 and 31 are slightly recessed to allow a clearance 36 (best shown in Fig. 18) for the entrance of the pressure behind the piston at each end of its stroke. These devices are operated by means of fluid-pressure, and to that end are provided with a series of ports and passages, which in this embodiment are adapted for the employment of compressed air, which is conducted to the inlet 40 by means of any suitable flexible connection which permits of the required movements of the table. The pressure flows through the passage 41 to the distributing-valve 42, which controls the induction and exhaust of the pressure to and from the two passages 43 and 44. The pressure when admitted through the passage 43 operates first to move the pawl 20 and its piston 21 from their inner positions in Figs. 5 and 6 to their outer positions, (shown in Figs. 7 and 8,) and by that movement of the piston a passage is opened by which the pressure, still operating through the passage 43, enters the pressure-chamber 26 between the stop 30 and the piston 25 and moves the latter to its position shown in Fig. 18, thereby moving the pawl-arm 22 to the position shown in Figs. 9 and 11. At this stage the distributing-valve 42 is moved to the postion shown in Fig. 4, thereby allowing the pressure to be exhausted through the passage 43 from the sides of the pistons 21 and 25 with which that passage communicates. This movement of the valve 42 also serves to admit pressure through the passage 44 to the outer end of the piston 21, thereby carrying it, with its pawl 20, to the inner or pawl-engaging position. (Shown in Figs. 11 and 12.) This movement of the piston serves to open communication from the passage 44 to the recess 36 between the oscillating piston 25 and the stop 31, thus moving that piston from the position shown in Fig. 18 to the opposite end of its stroke, and thereby moving the pawl-arm 22 to the position shown in Fig. 5, carrying with it the index-plate 11 in the direction indicated by the arrow shown thereon in the latter figure, in which position the index-plate is held by the pawl 20 and the detent-pawl 13 as long as may be desired and until the next operation of the pawl-arm. Having thus briefly described the movements of these devices under the operation of the pressure, a more specific description will now be given of the arrangement of the valve passages and ports by which the pressure is directed in the desired sequence to the respective sides of the pistons 21 and 25. For greater convenience in tracing out upon the drawings the operations of the fluid-pressure the direction of its movement through the various passages is indicated therein by small arrows. Feathered arrows are employed to indicate exhaust and unfeathered arrows to indicate pressure.

The valve 42, which controls the distribution of the pressure to the passages 43 and 44, is best shown in Figs. 1 to 4, inclusive. It is preferably cylindrical in form and is seated in a corresponding recess in the bed, being yieldingly held to the position shown in Fig. 4 by means of the spring 46. The induction ports and passages 47, leading from the inlet-passage 41, extend across the valve and open with equal area upon opposite walls of the valve-chamber, so that no lateral pressure is sustained by the valve 42, thereby enabling it to be moved freely, even when operating with high pressure. These induction ports and passages are so arranged as to be alternately brought into communication with the passages 43 and 44 by the longitudinal movements of the valve. The latter is also provided with exhaust-passages 48 and 49, which are also brought alternately into communication with the passages 43 and 44, respectively. As illustrated in Fig. 4, the induction-passages 47 communicate with the passage 44, while the exhaust-port 48 communicates with the passage 43, thereby enabling the pressure in the latter passage and its associated sides of the pistons 21 and 25 to be exhausted while the pressure is being admitted to the opposite sides of those pistons, and vice versa. Those portions of the passages 43 and 44 which are in the housings 3 are maintained in constant communication with the portions of those passages which are in the swinging head 4 by being conducted through the pivot-studs 5, on which that head swings, as best illustrated in Fig. 4. The passage 43 is extended from its pivot 5 to the annular recess 50 in the plate 23 around the bearing or journal of the pawl-arm 22, the wall of which is provided with a passage 51, leading to the annular groove 52 in the corresponding portion of the stem or shaft 12, as best shown in Figs. 4 and 8. The shaft 12 is also provided with a longitudinal duct 53, which extends the communication upwardly from the annular groove 52 to a similar groove 54, which in turn is maintained in constant communication, by means of the passage 55, with the inner end of the cylinder 56, which contains the indexing-pawl piston 21. Thus it will be seen that communication between the passage 43 and the inner end of the piston 21 is maintained at all positions of the shaft 12 and of the pawl-arm 22, by means of the passages and ducts 50, 51, 52, 53, 54, and 55, so that when the valve 42 admits the pressure to the passages 43 it passes through the said ducts to the inner end of the cylinder 56 and moves the piston 21, with its pawl 20, radially outward to the position shown in Figs. 8 and 10. The piston 21, as best shown in the latter figure, now serves as a valve for admitting the pressure to the chamber 26 by uncovering the passage 57, leading from the cylinder 56 to that chamber between the stop 30 and the oscillating piston 25, which is moved by the pressure to the position shown in Fig. 18, thus carrying the pawl-arm to the position shown in Fig. 9, as above described. The passage 44 communicates through its adjacent pivot-stud 5 of the swinging head to the lower end of the seat for the vertical gear-shaft 12, which is provided with a longitudinal duct 60, through which the pressure reaches the annular duct 61 around the outside of that shaft in the plane of the radial duct 62 in the indexing-arm 22, as best shown in Figs. 8 and 12, with which the passage 44 is thus at all times in direct communication. The duct 62 extends radially to the outer end of the arm 22 and enters the outer end of the pawl-cylinder 56, so that the pressure when admitted to the passage 44 operates to move the pawl-piston 21 from its outer position (shown in Fig. 8) to its inner position, (shown in Fig. 12,) so as to carry the indexing-pawl into engagement with the index-plate, as shown in Fig. 11. This inward movement of the piston 21 serving again as a valve uncovers the port 63, as best shown in Fig. 6, leading to the clearance 36 in the chamber 25 between the stop 31 and the oscillating piston 25, thus enabling the pressure to move the latter from the position shown in Fig. 18 against the stop 30, thereby moving the arm 22 and the index-plate 11 from the position of Fig. 11 to that of Fig. 5. As hereinbefore stated, the valve 42 permits the pressure to exhaust from the passage 43 when admitting it to the passage 44, and vice versa. Inasmuch as the first operation of the admitted pressure through either of the passages 43 or 44 is to move the piston 21 to the opposite end of its stroke it will be seen that the port 57 and the port 63, respectively, are immediately closed, thereby preventing the escape of the air from the corresponding exhaust sides of the oscillating piston 25. In order to allow continued free exhaust of the pressure from the respective exhaust sides of the oscillating piston 25, the piston 21 is provided near its opposite ends with auxiliary exhaust-ducts 65 and 66, which communicate with the ports 57 and 63, respectively, when the cylinder is in the positions shown in Figs. 13 and 14. These exhaust-ducts extend diametrically across the piston 21, as best shown in enlarged scale in Fig. 26, opening with equal area upon the opposite walls of the piston-chamber 56, so as to relieve the piston 21 from lateral pressure. The ducts 65 and 66 also extend longitudinally to their respective ends of the piston and are provided with return check-valves 67, which in the case of horizontal pistons are preferably held to their seats by light springs 68. As shown in Fig. 26, these springs are held in place by pins 69, the withdrawal of which permits the ready removal of the check-valve for disassembling. The function of these check-valves is to prevent the readmitted pressure from reaching the annular chamber 26 through the ducts 65 and 66, compelling the pressure to move the piston to the full limit of its stroke in each direction, and thus to move the indexing-pawl 20 definitely into or out of engagement with the index-plate before uncovering the respective ducts 57 and 63; by which alone the pressure is enabled to reach the piston 25.

The valve 42 may be operated by hand or it may be automatically operated by cams or eccentrics in any desired time and relation to the respective machines with which this apparatus may be employed. In Figs. 1, 2, and 25 is illustrated my preferred means for this particular type of machine, according to which the valve 42 is operated by the reciprocating movements of the table 2, upon which the apparatus is mounted. That table is provided with a slide 72, fitted in a suitable slideway 73. The inner surface of the slide is provided with an inclined abutment 74, located in engaging relation to the valve 42, which is thus operated by the longitudinal movements of the slide, as is best shown by comparison of Figs. 1 and 25. The slide 72 is also provided with a lug 75 for receiving the pressure of a spring 76, the other end of which rests against the shoulder 77 on the table, which is slotted, as best shown in Fig. 2, to permit the movements of the inclined abutment 74. The spring 76 is herein shown as a compression-spring, serving to move the slide 72 toward the left, as viewed in Figs. 1 and 25. As a means for moving the slide 72 toward the right and the valve 42 from the position of Fig. 1 to that of Fig. 25, the slide is provided with a stud 79, which is preferably made adjustable longitudinally of the slide 72, as best shown in Fig. 2, in order to allow of a correspondingly adjustable range of movement of the table 2 with its indexing apparatus. It is herein assumed that the work carried upon the spindle 6 will be operated upon while the table 2 is moving from left to right, as viewed in Fig. 1; but just before the table reaches the end of its travel upon its return movement from right to left the stud 79 collides with and is arrested by the fixed stop 80 upon the bed 1 of the machine, as shown in Fig. 25. The remaining portion of the travel of the table 2 toward the left carries the end of the valve 42 along the inclined face of the now stationary abutment 74 from the position shown in Fig. 1 to that of Fig. 25, thereby moving the valve 42 to the position in which it admits pressure through the passage 43 and inaugurates the backward movements of the indexing devices, as hereinbefore described. The forward travel toward the right of the table 2 is then resumed, thus carrying the stud 79 away from the stud 80 and permitting the abutment 74 to be withdrawn by the spring 76 from the valve 42, as shown in Fig. 1, thereby allowing the latter to be moved by its spring 46 to the position shown in Fig. 4, thus admitting the pressure through the passage 44 and inaugurating the forward movements of the indexing devices, moving them from the position shown in Fig. 9 to those of Figs. 11 and 5, respectively, where they remain throughout the operation upon the work during its forward travel and until the succeeding return of the table therefrom.

The table 2 is moved longitudinally by means of a rack and pinion or a screw in any of the many well-known ways employed for this purpose, the rate of the feed or forward travel and of the return movement being adapted to the nature of the work to be done. I prefer to control the driving and reversing operations of the table by the means illustrated in Figs. 2 and 4. The dogs 83 and 84 are mounted upon the table 2 and may be adjusted to any desired position longitudinally of the T-slot. (Best shown in Fig. 4.) These dogs extend into engaging relation with the respective ends of the slide 85, so that the latter is moved toward the right, as viewed in Fig. 2, by the dog 83 to reverse the forward movement of the table and is moved in the opposite direction by the dog 84 to stop and reverse the backward movement. The slide 85 may communicate with the table-driving devices in many well-known ways, but it is herein assumed that the enlarged portion 86 is a valve similar to that of 42 for controlling the admission of air-pressure to pneumatically-operated clutches, which are suitably connected with the driving mechanism for the table.

It will be obvious to those familiar with this art and with the construction of indexing apparatus in general that the indexing devices which are herein shown as being applied to the gear-shaft 12 may be applied directly to the main shaft 6, the embodiment herein shown being chosen for illustration, because this type of indexing apparatus is well known, and, furthermore, because it would present to the constructor a greater difficulty in adapting the invention to this type of machine than in adapting it to a simpler machine directly upon the main spindle. The extent of movement of the indexing-pawl arm being coincident with that of the oscillating piston 25 may be regulated and adjusted to the desired extent by means of the stop 31 and its bolt 32, and to facilitate the exact adjustment and setting of the parts the stop 31 or the margins of the concentric slot 34 may be graduated. The index-plates 11 are of simple construction and may be readily applied to and removed from the spindle. A comparatively small number of these plates with notches corresponding in number with multiples of the lower prime numbers will cover all the subdivisions of the circle which are ordinarily required in workshop practice. Hence the desirability for such uses of making the index-plate 11 easily detachable, so as to permit of the ready substitution of different index-plates; but when used in connection with a fixed number of notches, as in the case of a tool-turret or chuck, the index-plate portion thereof should be secured as firmly as possible to the sleeve or shaft 12, and under some conditions the turret, the index-plate, and the shaft or sleeve may preferably be made integral. The form of the notches herein shown and the fact that the pawl-arms are firmly seated and remain in those notches throughout the forward movement of the index and until the pawl-arm comes to rest insure more perfect indexing, inasmuch as they prevent the moving parts from being carried beyond the proper point by their own momentum, which is often considerable, especially in handling heavy work—such, for example, as a large tool-turret. By suitably reducing the size of the exhaust-ducts 65 and 66 in proportion to the size of the induction-passages, so as to retard the exhaust from the chamber 26, the stroke of the piston 25 may be cushioned to a considerable extent, thus avoiding sharp impact against the stops 30 and 31.

In situations where space and other considerations permit the valve 42 may be arranged longitudinally of the table or slide and be connected directly with the stud 79 or other operating devices without the intervention of the cam-slide 72.

These devices are capable of adaptation and extension to many other uses than those herein shown and described. For example, the advancing and retreating pawl may be utilized to engage and move various kinds of spaced indexing members either in a curved or straight path, and the advancing and retreating movement of the pawl may be effected by independent fluid-pressure engines, as herein described, for giving to the pawl its movements of engagement and advance and also its movements of disengagement and retreat, one of the said fluid-pressure engines serving to effect the valvular control of the other engine.

This apparatus or a suitable modification thereof may also be applied to the index of a tool-turret or any analogous device, and in serving its many possible functions the apparatus may be mounted upon any reciprocating slide or table—such as the table of a planing-machine, the carriage of a lathe, or the turret-slide of a screw-machine or chucking-machine—inasmuch as no mechanical connection is required between such a table or slide and the bed upon which it reciprocates, the pressure being conveyed directly to the slide by means of flexible jointed or telescoping tubing in many ways well known to mechanics familiar with the machinery to which these inventions are applicable.

I claim as my invention—

1. In an indexing device, the combination of an indexing-pawl, means for moving the said pawl to advance the indexed member, and fluid-pressure-operated means for moving the pawl aside from the direction of its advancing movement, to move the pawl into engagement with the indexed member.

2. In an indexing device, the combination of an indexing-pawl, fluid-pressure-operated means for moving the pawl to advance the indexed member, and fluid-pressure-operated means to carry the pawl aside from the direction of its advancing movement into and out of engagement with the indexed member.

3. In an indexing device, the combination of a reciprocating pawl-carrier, a pawl mounted to reciprocate thereon, and means for reciprocating the pawl on the carrier, through the medium of fluid-pressure.

4. In an indexing device, the combination of a reciprocating pawl-carrier, a pawl mounted to reciprocate thereon, and means for operating the pawl and its carrier in proper relation, through the medium of fluid-pressure.

5. In an indexing device, the combination of a reciprocating pawl-carrier, a pawl mounted to reciprocate thereon, fluid-pressure-operated means for reciprocating the carrier, fluid-pressure-operated mechanism for moving the pawl into operative position previous to the movement of its carrier in one direction, and for moving the pawl out of operative position previous to the movement of its carrier in the opposite direction.

6. In an indexing device, the combination of a reciprocating pawl-carrier, a pawl mounted thereon, fluid-pressure chambers for the carrier and the pawl and means for controlling the admission of fluid-pressure to operate, first the pawl, and then the pawl-carrier.

7. In an indexing device, the combination of a reciprocating pawl-carrier, a pawl thereon, fluid-pressure-operated means for advancing the pawl-carrier, and fluid-pressure-operated means for retaining the pawl in operative position throughout the advancing movement of the carrier.

8. In an indexing device, the combination of a reciprocating pawl-carrier, a pawl thereon, fluid-pressure-operated means for advancing and returning the pawl-carrier, and fluid-pressure-operated means for holding the pawl in inoperative position throughout the return movement of the carrier.

9. In an indexing device, the combination of an oscillating pawl-arm, a pawl and pawl-piston mounted thereon, a piston for operating the pawl-arm, fluid-pressure chambers for the pawl-arm piston and the pawl-piston, and means for admitting fluid-pressure to the respective chambers, first to operate the pawl-piston and then to operate the pawl-arm piston at the completion of the required movement of the pawl.

10. In an indexing device, the combination of a reciprocating pawl-carrier, and a pawl-piston mounted thereon, means to operate them by fluid-pressure, and a port in the pawl-carrier controlled by the pawl-piston and opened thereby at the completion of its required stroke to admit the pressure from behind the pawl-piston to the carrier-operating means.

11. In an indexing device, the combination of a reciprocating pawl-carrier, a chamber, a piston therein for operating the carrier, a cylinder on the carrier, a pawl-piston mounted to reciprocate therein under the operation of fluid-pressure, and two ports in the carrier leading to opposite sides of the pawl-carrier piston, arranged to be controlled by the pawl-piston, one port being uncovered at the completion of its stroke in one direction, and the other port being uncovered at the completion of its stroke in the opposite direction.

12. In an indexing device, the combination of an oscillating pawl-arm, a pawl mounted to reciprocate upon the pawl-arm in a substantially radial relation to the axis of oscillation of the arm, and means for operating the pawl through the medium of fluid-pressure.

13. In an indexing device, the combination of an oscillating pawl-arm, a pawl provided with a piston mounted to reciprocate in the pawl-arm in a substantially radial relation to the axis of oscillation thereof, the arm being provided with a chamber for the piston and with radially-extending ducts for distributing fluid-pressure to the respective ends of the pawl-piston.

14. The combination in an indexing apparatus of a pawl-arm journaled to oscillate in the apparatus, a cylinder in the arm, a piston therein, a pawl connected with the piston and arranged to reciprocate in a substantially radial relation to the axis of oscillation of the arm, and a series of induction and exhaust ducts for fluid-pressure extending from the journals of the arm to the respective ends of the piston.

15. The combination in an indexing apparatus, of an oscillating pawl-arm, a pressure-chamber therein, a pawl provided with a piston arranged to reciprocate in the chamber in a substantially radial relation to the axis of oscillation of the arm, a series of ducts for fluid-pressure extending from the journals of the arm to the respective ends of the piston, and a corresponding series of annular passages arranged concentrically with the journals of the arm, and communicating with the source of pressure for maintaining communication with the ducts of the arm, at all the oscillatory positions thereof.

16. The combination, with a shaft, of indexing devices therefor, comprising a pawl-carrier journaled in a substantially concentric relation to the shaft, a pawl and a piston mounted and movable on the pawl-carrier, the latter being provided with a passage for conducting fluid-pressure to the pawl-piston.

17. The combination, with a shaft, of indexing devices therefor, comprising a pawl-carrier journaled in a substantially concentric relation to the shaft, a pressure-chamber in the carrier, and a pawl-piston mounted in the chamber, the pawl-carrier being provided with a plurality of independent passages for conducting fluid-pressure to opposite ends of the pawl-piston.

18. The combination, with a shaft, of indexing devices therefor, comprising a pawl-arm journaled in a substantially concentric relation to the shaft, a pressure-chamber, a pawl movable on the pawl-arm and operable from the pressure-chamber, the shaft and the pawl-arm being provided with a passage for conducting fluid-pressure to the pressure-chamber.

19. The combination, with a shaft, of indexing devices therefor, comprising a pawl-arm journaled in substantially concentric relation to the shaft, a pressure-chamber, and a pawl provided with a piston mounted in the chamber, the shaft and the pawl-arm being provided with a plurality of independent passages for conducting fluid-pressure to opposite ends of the pawl-piston.

20. The combination with a shaft, of indexing devices therefor, comprising a pawl-arm journaled concentrically with the shaft, a pressure-chamber, a pawl-piston mounted in the chamber and movable in a substantially radial relation to the shaft, the shaft and the arm being provided with a passage for conducting fluid-pressure to the pawl-piston, the passage being extended circumferentially of the shaft to maintain its communication during the movements of the arm.

21. The combination with a shaft, of indexing devices therefor, comprising a pawl-arm journaled concentrically with the shaft, a pressure-chamber, a pawl-piston mounted in the chamber and movable in a substantially radial relation to the shaft, the shaft and the arm being provided with a plurality of passages for conducting fluid-pressure to the opposite ends of the piston, the said passages being extended circumferentially of the shaft, to maintain their communication during the movements of the arm.

22. In an indexing device, the combination of a support having an annular chamber, a pawl-arm journaled substantially concentric therewith, and provided with a piston working in the said chamber, a chamber appurtenant to the pawl-arm, a pawl provided with a piston working in the chamber of the pawl-arm, a passage for conducting fluid-pressure from the journal of the pawl-arm to the pawl-arm chamber, and a duct leading to the annular chamber from a port in the pawl-arm chamber, located so as to be uncovered by the pawl-piston in completing its stroke.

23. In an indexing device, the combination of a support having an annular chamber, a pawl-arm journaled substantially concentric therewith, and provided with a piston working in the said chamber, a chamber appurtenant to the pawl-arm, a pawl provided with a piston working in the piston-chamber of the pawl-arm, a plurality of passages for conducting fluid-pressure from the journal of the pawl-arm to the respective ends of the pawl-arm chamber, and ducts leading to the ends of the annular chamber from ports located near the respective ends of the pawl-arm chamber, the said ports being so located as to be uncovered by the pawl-piston in completing the respective strokes thereof.

24. In an indexing device, the combination of a support having an annular chamber, a plate 23 forming the cover for the chamber, a pawl-arm journaled in the plate and provided with a piston working in the said chamber, a chamber appurtenant to the pawl-arm, a pawl provided with a piston working in the chamber of the pawl-arm, and a passage for conducting fluid-pressure through the plate to the journal of the pawl-arm, and communicating thence with the pawl-arm chamber.

25. In an indexing device, the combination of a support having an annular chamber, a plate 23 forming the cover for the chamber, a pawl-arm journaled in the plate and provided with a piston working in the said chamber, a chamber appurtenant to the pawl-arm, a pawl provided with a piston working in the chamber of the pawl-arm, and a passage for conducting fluid-pressure through the plate to the journal of the pawl-arm, and communicating thence with the pawl-arm chamber, the passage being extended in the plate in annular relation to the journal of the pawl-arm, to maintain the passage in open communication throughout the movements of the pawl-arm.

26. In an indexing device, the combination of a support having an annular chamber, an oscillating pawl-arm provided with a piston working in the said chamber, a chamber appurtenant to the pawl-arm, a pawl provided with a piston mounted in the pawl-arm chamber to reciprocate in a substantially radial relation to the axis of oscillation of the arm, and means for controlling the admission of fluid-pressure alternately to opposite sides of the pawl-arm piston.

27. In a fluid-pressure-operated indexing device, the combination of an annular pressure-chamber, a piston therein, arranged to operate one of the elements of the indexing device, and an annularly-adjustable stop for varying the annular dimensions of the chamber to correspondingly vary the extent of the indexing movement.

28. In combination with an indexing mechanism, means for operating the said mechanism, comprising an annular chamber for fluid-pressure, provided with stops for determining the annular length of the chamber, one of the said stops being adjustable for varying the said annular length to correspondingly vary the extent of the indexing movement.

29. In combination with an indexing mechanism, means for operating and adjusting the said mechanism, comprising an annular chamber for fluid-pressure, a piston mounted to oscillate therein, and operably connected with the indexing mechanism, stops forming the ends of the annular chamber, and determining the stroke of the piston, and means for adjusting one of the said stops from the exterior of the chamber.

30. In a fluid-pressure-operated indexing device, an annular chamber for the pressure, a piston mounted to oscillate therein, and operably connected with one of the elements of the indexing mechanism, and stops, forming the ends of the annular chamber and determining the stroke of the piston, one of the said stops being adjustable to vary the length of the said stroke, the abutting faces of the piston and its stops being provided with clearance for admission of the pressure.

31. The combination, in a fluid-pressure-operated indexing device, of an indexing-pawl, a swinging arm for the pawl, a fluid-pressure piston and chamber for swinging the arm, a fluid-pressure piston and chamber for moving the pawl into and out of indexing position, ducts for conveying the pressure to, and exhausting it from one chamber through the other chamber, one of the said ducts opening from a port in the latter chamber which is covered by its piston during the exhausting operation, the piston being provided with an auxiliary exhaust-duct and check-valve leading from the said port to the exhaust-duct of its own chamber, when the port is thus covered.

32. In an indexing device, a swinging head, fluid-pressure-operated indexing devices mounted on the head, a pivot for supporting the swinging head upon the table, and a passage for the fluid-pressure extending from the table through the supporting-pivot, and communicating with the said indexing devices at all positions of the swinging head.

33. In an indexing apparatus operated by fluid-pressure, the combination of a table, a swinging head, fluid-pressure-operated indexing devices mounted on the head, a pair of oppositely-disposed pivots for supporting the swinging head upon the table, and a plurality of passages for the pressure extending from the table, through the respective pivots, and to the indexing devices, whereby separate and independent communications for the fluid-pressure are maintained between the table and the indexing devices carried on the swinging head, at all positions of the latter.

34. The combination in an indexing device, of fluid-pressure-operated devices for effecting the indexing movement, means for adjusting the said indexing devices to vary the length of the indexing stroke, a detent-pawl for holding the indexed member in position, and means for adjustably mounting the detent-pawl, consisting of a pivot-block for the pawl, having an arc-shaped base, and a support for the pivot-block having an arc-shaped seat for receiving the base of the pivot-block, concentric with the axis of the indexed member, and means for clamping the said pivot-block in its seat.

35. The combination with a reciprocating table, of fluid-pressure-operated indexing devices mounted thereon, a valve for controlling the distribution of the pressure to operate the indexing devices, and means operable by the reciprocating movements of the table, for operating the valve to work the indexing apparatus in suitable relation to the movements of the table.

36. The combination with a reciprocating table, of fluid-pressure-operated indexing devices mounted thereon, a pressure-distributing valve arranged and movable transversely of the table to control the movements of the indexing devices, a cam-slide mounted and movable longitudinally of the table, and a stud for operating the cam-slide to inaugurate the indexing movements in suitable relation to the movements of the table.

37. In combination with a reciprocating table, fluid-pressure-operated indexing devices mounted thereon, a pressure-distributing valve mounted and movable transversely of the table to distribute the pressure to the indexing devices, a cam-slide mounted and movable longitudinally of the table for working the valve, and an adjustable stud for colliding with the cam-slide to inaugurate the indexing operations at the end of the reciprocation of the table.

38. In combination with a reciprocating table, fluid-pressure-operated indexing devices mounted thereon, a pressure-distributing valve mounted and movable transversely of the table to distribute the pressure to the indexing devices, a cam-slide mounted and movable longitudinally of the table, and provided with an inclined abutment for moving the valve to inaugurate the movements of the indexing devices, and means for yieldingly holding the valve into contact with the cam-slide and its abutment.

39. In combination with a reciprocating table, fluid-pressure-operated indexing devices mounted thereon, a pressure-distributing valve mounted and movable transversely of the table, for controlling the movements of the indexing devices, a cam-slide mounted and movable longitudinally of the table and provided with an inclined abutment for moving the valve, means for holding the valve into contact with the cam-slide abutment, a stop for operating the cam-slide and the valve to inaugurate the indexing movement during the movement of the table in one direction, and a spring for returning the cam-slide upon the reverse movement of the table.

40. In an indexing device, the combination, of a pawl adapted to engage the member which it is to advance and then to advance that member, and independent fluid-pressure engines for giving to the pawl its movements of engagement and advance, and means whereby one of the said engines effects the valvular control of the other engine.

41. In an indexing device, the combination, of a pawl adapted to engage the member to be advanced, an advancing and retreating carrier for the pawl, a fluid-pressure engine carried by said carrier and adapted to give said pawl its engaging movement, and an independent fluid-pressure engine adapted to give said carrier its advance and retreating motions, and means whereby one of said engines effects also the valvular control of the other engine.

42. In an indexing device, the combination, of a spaced indexing member to be intermittently advanced, an advancing and retreating pawl-carrier and pawl to effect the advance of said member, a fluid-pressure engine adapted to give the advancing and retreating motion to said pawl-carrier, and means for adjusting the stroke of said engine in correspondence with the spacing of said indexing member.

43. In an indexing device, the combination of an oscillating-piston fluid-pressure engine, a reciprocating fluid-pressure engine carried by the piston of said oscillating engine, a pawl carried by the piston of the reciprocating engine, a notched indexing-plate mounted concentric to the oscillating engine and arranged to be engaged by the pawl.

44. The combination, with a reciprocatory carriage, of a head-stock mounted on said carriage, a chamber carried by the head-stock, means for supplying fluid under pressure to said chamber, a piston in said chamber, a shaft connected to said piston, indexing mechanism controlled by said shaft, a valve, means for supplying fluid-pressure to said valve, and means for actuating the valve.

Signed at Hartford, Connecticut, this 18th day of May, 1901.

B. M. W. HANSON.

Witnesses:
F. V. BARTLETT,
WM. H. HONISS.